US009650562B2

(12) United States Patent
Zhou et al.

(10) Patent No.: US 9,650,562 B2
(45) Date of Patent: May 16, 2017

(54) RARE EARTH OXYSULFIDE LUMINESCENT MATERIAL AND PREPARATION METHOD THEREFOR

(71) Applicants: OCEAN'S KING LIGHTING SCIENCE & TECHNOLOGY CO., LTD., Shenzhen (CN); SHENZHEN OCEAN'S KING LIGHTING ENGINEERING CO., LTD, Shenzhen (CN)

(72) Inventors: Mingjie Zhou, Shenzhen (CN); Rong Wang, Shenzhen (CN)

(73) Assignee: OCEAN'S KING LIGHTING SCIENCE & TECHNOLOGY CO., LTD., Shenzhen (CN)

( * ) Notice: Subject to any disclaimer, the term of this patent is extended or adjusted under 35 U.S.C. 154(b) by 196 days.

(21) Appl. No.: 14/439,010

(22) PCT Filed: Oct. 31, 2012

(86) PCT No.: PCT/CN2012/083883
§ 371 (c)(1),
(2) Date: Apr. 28, 2015

(87) PCT Pub. No.: WO2014/067114
PCT Pub. Date: May 8, 2014

(65) Prior Publication Data
US 2015/0291877 A1    Oct. 15, 2015

(51) Int. Cl.
*C09K 11/84*    (2006.01)
*C09K 11/78*    (2006.01)
(Continued)

(52) U.S. Cl.
CPC ........ *C09K 11/025* (2013.01); *C09K 11/7789* (2013.01); *C09K 11/873* (2013.01)

(58) Field of Classification Search
CPC .......................... C09K 11/025; C09K 11/7789
See application file for complete search history.

(56) References Cited

U.S. PATENT DOCUMENTS 3,989,977 A    11/1976    Ashizaki
2002/0105266 A1    8/2002    Juestel et al.

FOREIGN PATENT DOCUMENTS

CN    102061168 A    5/2011
CN    102337136 A    2/2012
(Continued)

OTHER PUBLICATIONS

Takayuki Hirai, et al., Preparation of Gd2O3_Eu3+ and Gd2O2S_Eu3+ phosphor fine particles using an emulsion liquid membrane system, Journal of Colloid and Interface Science, 253, 62-69 (2002).
(Continued)

Primary Examiner — Carol M Koslow
(74) Attorney, Agent, or Firm — Shimokaji IP

(57) ABSTRACT

Provided is an oxysulfide luminescent material. The luminescent material has a general chemical formula of $Ln_{2-x}O_2S:Eu_x^{3+}@M_y$, wherein @ is coating, Eu is doped in $Ln_{2-x}O_2S$, $Ln_{2-x}O_2S:Eu^x_{3+}$ has a porous structure, and M is located in pores of the $Ln_{2-x}O_2S:Eu_x^{3+}$. In the oxysulfide luminescent material, metal nano particles coating is used to form a core-shell structure, which increases luminescent efficiency of the oxysulfide luminescent material in a same excitation condition; in addition, a hollow structure is formed between a core and a shell layer of the oxysulfide luminescent material, which effectively reduces usage of rare earth elements in the shell layer and lowers cost of the luminescent material. Also provided is a preparation method for the oxysulfide luminescent material.

9 Claims, 2 Drawing Sheets

(51) Int. Cl.
*C09K 11/02* (2006.01)
*C09K 11/77* (2006.01)
*C09K 11/87* (2006.01)

(56) References Cited

FOREIGN PATENT DOCUMENTS

| | | |
|---|---|---|
| EP | 0491406 A1 | 6/1992 |
| JP | H09235547 A | 9/1997 |
| JP | H1161113 A | 3/1999 |
| JP | 2004143277 A | 5/2004 |
| JP | 2010202708 A | 9/2010 |
| JP | 2011066227 A | 3/2011 |
| WO | 2009023350 A2 | 2/2009 |
| WO | 2011120227 A1 | 10/2011 |

OTHER PUBLICATIONS

Chongfeng Guo, et al., Preparation__of__Y2O2SEu3+__phosphors__by__a__novel__decomposition__method, Materials Letters, 62 (2008) 600-602.

Qilin Dai, et al. Size and Concentration Effects on the Photoluminescence of La2O2SEu3+ Nanocrystals, J. Phys. Chem. C, 2008, 112, 19399-19404.

RARE EARTH OXYSULFIDE LUMINESCENT MATERIAL AND PREPARATION METHOD THEREFOR

FIELD OF THE INVENTION

The present invention relates to the field of luminescent material, particularly to an oxysulfide luminescent material and preparation method therefor.

BACKGROUND OF THE INVENTION

In recent years, field emission devices have attracted much attention due to the advantages, such as low operating voltage, low power consumption, no deflection coil, no X-ray radiation, radiation resistance and magnetic interference resistance, etc. By exciting the luminescent material using field emission cathode ray, field emission light source of high luminance and good color rendering properties can be obtained, which can be applied to professional lighting, display, instructions, general lighting and other fields. Similar to the working principle of conventional cathode-ray tube (CRT), such field emission display lights and forms images by electron beam bombarding on red, green blue trichromatic fluorescent powders. Field emission display has potential advantages in luminance, visual angle, response time, working temperature range, power consumption and other aspects.

Oxsulfides have becoming important hosts for luminescent material activated by rare earth elements, due to good chemical stability, poorly soluble in water, high melting point, strong resistance to oxidation, high light-absorption efficiency and non-toxic. An oxysulfide doped with europium $Ln_2O_2S:Eu^{3+}$ is an important red luminescent material having excellent properties and widely used. However, low luminescent efficiency of the traditional oxysulfide luminescent material limits its further application.

SUMMARY OF THE INVENTION

In view of this, it is necessary to provide an oxysulfide luminescent material having relatively high luminescent efficiency.

An oxysulfide luminescent material having a general chemical formula of $Ln_{2-x}O_2S:Eu_x^{3+}@M_y$, where $Eu^{3+}$ is doped in $Ln_{2-x}O_2S$; $Ln_{2-x}O_2S:Eu_x^{3+}$ has a porous structure, and @ is coating; Ln is selected from Y, Gd and La; M is at least one of Ag, Au, Pt, Pd and Cu nanoparticles; x is in a range of $0<x\leq0.2$; y is a molar ratio of M to $Ln_{2-x}O_2S:Eu_x^{3+}$ and y is in a range of $0<y\leq1\times10^{-2}$.

In one embodiment, x is in a range of $0.001\leq x<0.1$.

In another embodiment, y is in a range of $1\times10^{-5}\leq y\leq1\times10^{-3}$.

By coating a metal nanoparticle M, the oxysulfide luminescent material forms a core-shell structure, where M is an inner core and porous material of $Ln_{2-x}O_2S:Eu_x^{3+}$ is an outer shell. The structure improves internal quantum efficiency of the oxysulfide luminescent material. Meanwhile, the luminescent efficiency of the material is greatly increased under same excitation conditions due to plasma effect of metal, and the wavelength of emitting light remains unchanged. There is enough space between the inner core and the outer shell so reducing the amount of rare earth element of the outer shell and reducing the costs.

In addition, it is necessary to provide a method for preparing an oxysulfide luminescent material having relatively high luminescent efficiency.

A method for preparing an oxysulfide luminescent material, comprising:

mixing and reacting a solution of salt containing metal M with an additive and a reducing agent to prepare a colloid containing M, wherein the metal M is at least one of Ag, Au, Pt, Pd and Cu nanoparticles; the additive is at least one of polyvinylpyrrolidone, sodium citrate, cetyl trimethyl ammonium bromide, sodium dodecyl sulfate and sodium dodecyl sulfonate;

adding the colloid containing M to an ethanol solution of sucrose or glucose to obtain a mixed solution, then heating the mixed solution at 120° C.-200° C. to form a solution of C@M, and centrifuging the solution of C@M, washing and drying to obtain C@M nanospheres; @ is coating M with C (carbon), and a molar ratio of M to C from sucrose or glucose is in a range of $5\times10^{-4}$-$5\times10^{-2}$;

adding the C@M nanospheres to a solution of $Ln^{3+}$ and $Eu^{3+}$ according to a molar ratio of $Ln^{3+}$ to $Eu^{3+}$ to M which is (2-x):x:y; regulating the pH value of the solution to 2-3, followed by adding oxalic acid and regulating the pH value to 8-9 to obtain a liquid suspension of $Ln_2(C_2O_4)_3:Eu^{3+}@C@M$; separating the liquid suspension to obtain $Ln_2(C_2O_4)_3:Eu^{3+}@C@M$ solid; $Ln^{3+}$ is $Y^{3+}$, $Gd^{3+}$ or $La^{3+}$, and x is in a range of $0<x\leq0.2$, y is in a range of $0<y\leq1\times10^{-2}$; and, mixing sulfur powders with the $Ln_2(C_2O_4)_3:Eu^{3+}@C@M$ solid according to a molar ratio of S to $Ln^{3+}$ which is 1:(2-x), followed by adding a fluxing agent and calcining at 1000° C.-1450° C. to obtain an oxysulfide luminescent material having a general chemical formula of $Ln_{2-x}O_2S:Eu_x^{3+}@M_y$; $Eu^{3+}$ is doped in $Ln_{2-x}O_2S$ to form $Ln_{2-x}O_2S:Eu_x^{3+}$ having a porous structure, and @ is coating.

In one embodiment, solute of the solution of salt containing metal M is at least one of $PdCl_2.2H_2O$, $AuCl_3HCl.4H_2O$, $H_2PtCl_6.6H_2O$, $AgNO_3$ and $Cu(NO_3)_2$; solvent of the solution is deionized water or ethanol; a concentration of the solution is in a range of $1\times10^{-3}$-$5\times10^{-2}$ mol/L.

In another embodiment, the additive is at least one of polyvinylpyrrolidone, sodium citrate, cetyl trimethyl ammonium bromide, sodium dodecyl sulfate and sodium dodecyl sulfonate; a concentration of the additive is in a range of $1\times10^{-4}$ g/mL-$5\times10^{-2}$ g/mL to the colloid containing M.

In yet another embodiment, the reducing agent is at least one of hydrazine hydrate, ascorbic acid, sodium citrate and sodium borohydride; a molar ratio of the reducing agent to M is in a range of 3.6:1-18:1.

In still another embodiment, the solution of $Ln^{3+}$ and $Eu^{3+}$ is a mixed solution of $Ln(NO_3)_3$ and $Eu(NO_3)_3$.

In another embodiment, the fluxing agent is anhydrous sodium carbonate ($Na_2CO_3$); a molar ratio of the fluxing agent to the sulfur powder is in a range of 1:100-1:10.

The method for preparing an oxysulfide luminescent material involves preparing a colloid containing metal nanoparticles, then coating carbon on the metal nanoparticles by a hydrothermal method using sucrose or glucose as starting material, followed by preparing precursor powders by precipitating $Ln^{3+}$ and $Eu^{3+}$ using a oxalic acid. After that, the precursor powders, sulfur powders and an additive are mixed and calcined to obtain an oxysulfide luminescent material containing metal nanoparticles inside. During the calcination process, carbon is released by being converted into $CO_2$. The method for preparing an oxysulfide luminescent material is simple, easy to control, low cost and suitable for industrial production. The obtained oxysulfide luminescent material has high luminescent efficiency and a broad application prospect.

DETAILED DESCRIPTION OF ILLUSTRATED EMBODIMENTS

Further description of the oxysulfide luminescent material and preparation method therefor will be illustrated, which combined with preferred embodiments and the drawings.

In one embodiment, an oxysulfide luminescent material has a general chemical formula of $Ln_{2-x}O_2S$:$Eu_x^{3+}$@$M_y$, where $Eu^{3+}$ is doped in $Ln_{2-x}O_2S$. $Ln_{2-x}O_2S$:$Eu_x^{3+}$ has a porous structure, and @ is coating; that is, M is located in pores of the $Ln_{3-x}O_2S$:$Eu_x^{3+}$. Ln is selected from Y, Gd and La, and M is at least one of Ag, Au, Pt, Pd and Cu nanoparticles. X is in a range of 0<x≤0.2, and y is a molar ratio of M to $Ln_{2-x}O_2S$:$Eu_x^{3+}$ in a range of 0<y≤1×10$^{-2}$.

Furthermore, in another preferred embodiment, x is in a range of 0.001≤x≤0.1, and y is in a range of $1\times10^{-5} \leq y \leq 1\times10^{-3}$.

By coating a metal nanoparticle M, the oxysulfide luminescent material forms a core-shell structure, where M is an inner core and porous material of $Ln_{2-x}O_2S$:$Eu_x^{3+}$ is an outer shell. The structure improves internal quantum efficiency of the oxysulfide luminescent material. Meanwhile, the luminescent efficiency of the material is greatly increased under same excitation conditions due to plasma effect of metal, and the wavelength of emitting light remains unchanged. There is enough space between the inner core and the outer shell so reducing the amount of rare earth element of the outer shell and reducing the costs.

Figure 1:
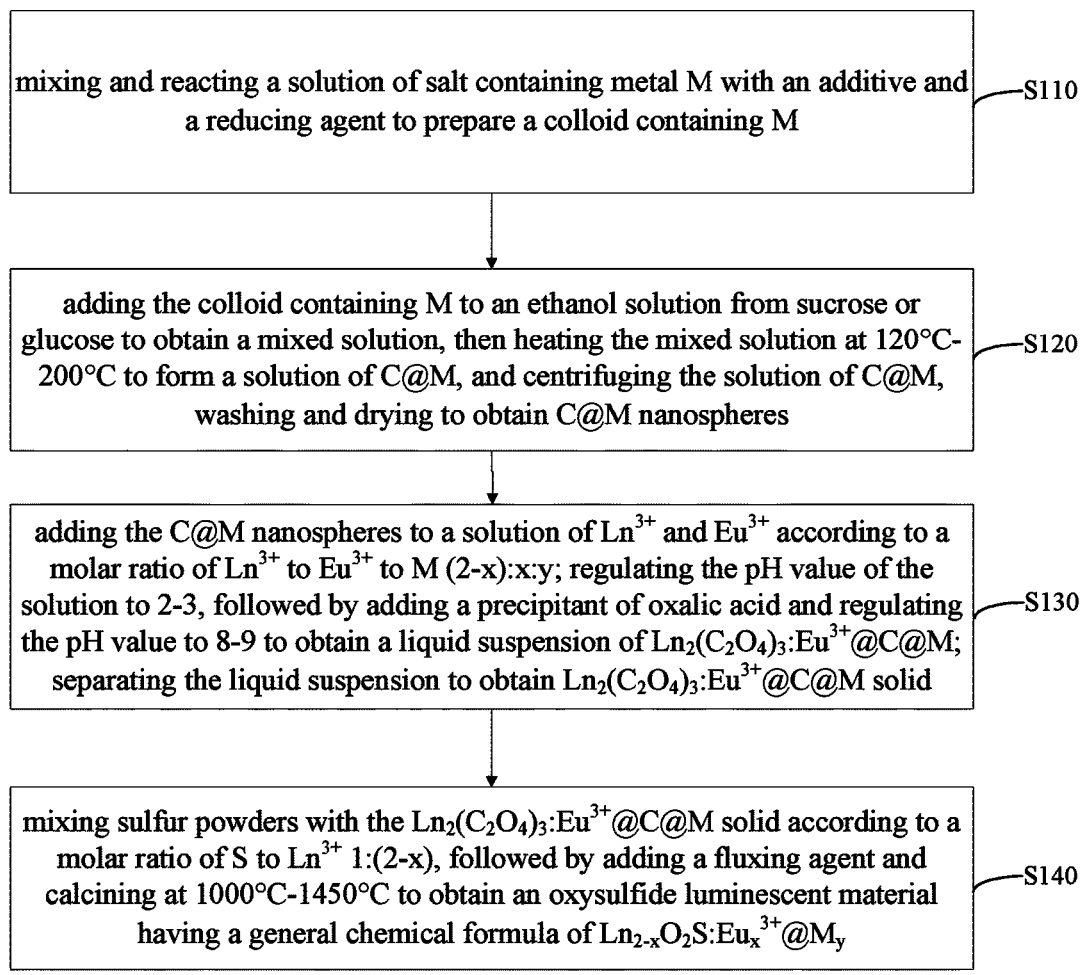
FIG. 1 is a flow diagram showing the preparation of the oxysulfide luminescent material according to one embodiment of the present invention.

In addition, one embodiment of a preparation of the oxysulfide luminescent material having relatively high luminescent efficiency is provided. As shown in FIG. 1, the preparation comprises step S110, S120, S130 and S140.

Step S110: mixing and reacting a solution of salt containing metal M with an additive and a reducing agent to prepare a colloid containing M.

Solute of the solution of salt containing metal M is at least one of $PdCl_2 \cdot 2H_2O$, $AuCl_3HCl \cdot 4H_2O$, $H_2PtCl_6 \cdot 6H_2O$, $AgNO_3$ and $Cu(NO_3)_2$; solvent of the solution is deionized water or ethanol. In this embodiment, concentration of the solution of salt containing metal M is in a range of $1\times10^{-3}$-$5\times10^{-2}$ mol/L. Metal M obtained herein is at least one of Ag, Au, Pt, Pd and Cu.

The additive is at least one of polyvinylpyrrolidone, sodium citrate, cetyl trimethyl ammonium bromide, sodium dodecyl sulfate and sodium dodecyl sulfonate; a concentration of the additive is in a range of $1\times10^{-4}$ g/mL-$5\times10^{-2}$ g/mL to the colloid containing M.

The reducing agent is at least one of hydrazine hydrate, ascorbic acid, sodium citrate and sodium borohydride; a molar ratio of the reducing agent to M is in a range of 3.6:1-18:1.

Step S120: adding the colloid containing M to an ethanol solution from sucrose or glucose to obtain a mixed solution, then heating the mixed solution at 120° C.-200° C. to form a solution of C@M, and centrifuging the solution of C@M, washing and drying to obtain C@M nanospheres. Herein, the notation of @ is coating M with C, and a molar ratio of M to C from sucrose or glucose is in a range of $5\times10^{-4}$-$5\times10^{-2}$.

Step S130: adding the C@M nanospheres to a solution of $Ln^{3+}$ and $Eu^{3+}$ according to a molar ratio of $Ln^{3+}$ to $Eu^{3+}$ to M (2-x):x:y; regulating the pH value of the solution to 2-3, followed by adding a precipitant of oxalic acid and regulating the pH value to 8-9 to obtain a liquid suspension of $Ln_2(C_2O_4)_3$:$Eu^{3+}$@C@M; separating the liquid suspension to obtain $Ln_2(C_2O_4)_3$:$Eu^{3+}$@C@M solid.

Herein, $Ln^{3+}$ is $Y^{3+}$, $Gd^{3+}$ or $La^{3+}$. X is in a range of 0<x≤0.2, and y is in a range of 0<y≤1×10$^{-2}$. The solution of $Ln^{3+}$ and $Eu^{3+}$ is mixed solution of $Ln(NO_3)_3$ and $Eu(NO_3)_3$. The solution could be prepared by dissolving oxides of Ln and oxides of Eu in nitric acid, or by dissolving nitrates of Ln and nitrates of Eu in water.

Step S140: mixing sulfur powders with the $Ln_2(C_2O_4)_3$:$Eu^{3+}$@C@M solid according to a molar ratio of S to $Ln^{3+}$ 1:(2-x), followed by adding a fluxing agent and calcining at 1000° C.-1450° C. to obtain an oxysulfide luminescent material having a general chemical formula of $Ln_{2-x}O_2S$:$Eu_x^{3+}$@$M_y$. During the calcination process, carbon in the C@M is released by being converted into $CO_2$. In the obtained material of $Ln_{2-x}O_2S$:$Eu_x^{3+}$@$M_y$, $Eu^{3+}$ is doped in $Ln_{2-x}O_2S$, and $Ln_{2-x}O_2S$:$Eu_x^{3+}$ has a porous structure. The notation of @ is coating. M is located in pores of the $Ln_{2-x}O_2S$:$Eu_x^{3+}$.

In this embodiment, the fluxing agent is anhydrous sodium carbonate ($Na_2CO_3$); a molar ratio of the fluxing agent to the sulfur powder is in a range of 1:100-1:10.

The method for preparing an oxysulfide luminescent material involves preparing a colloid containing metal nanoparticles, then coating carbon on the metal nanoparticles by a hydrothermal method using sucrose or glucose as starting material, followed by preparing precursor powders by precipitating $Ln^{3+}$ and $Eu^{3+}$ using a oxalic acid. After that, the precursor powders, sulfur powders and an additive are mixed and calcined to obtain an oxysulfide luminescent material containing metal nanoparticles inside. During the calcination process, carbon is released by being converted into $CO_2$. The method for preparing an oxysulfide luminescent material is simple, easy to control, low cost and suitable for industrial production. The obtained oxysulfide luminescent material has high luminescent efficiency and a broad application prospect.

Further description of the oxysulfide luminescent material and preparation method therefor will be illustrated, which combined with preferred embodiments and their performance tests.

EXAMPLE 1

An oxysulfide luminescent material having a general chemical formula of $La_{1.9}O_2S$:$Eu_{0.1}^{3+}$@$Pd_{0.00001}$ was prepared. The notation of @ was coating the latter with the former.

Preparation of colloid containing Pd nanoparticles. 0.22 mg of palladium chloride ($PdCl_2 \cdot 2H_2O$) was dissolved in 19 mL of deionized water, followed by adding 11.0 mg of sodium citrate and 4.0 mg of sodium dodecyl sulfate while magnetically stirring to obtain a mixed solution. 3.8 mg of sodium borohydride were dissolved in 10 mL of deionized water to obtain a solution of sodium borohydride having a concentration of $1\times10^{-2}$ mol/L. While stirring, 1 mL of the solution of sodium borohydride was rapidly added to the mixed solution. The reaction was conducted for 20 minutes to produce 20 mL of colloid containing Pd nanoparticles having a concentration of $5\times10^{-5}$ mol/L.

Preparation of C@Pd nanospheres. 4 g of glucose were dissolved in 32 mL of anhydrous ethanol to prepare an ethanol solution of glucose. 8 mL of the colloid were added to the ethanol solution of glucose to prepare a mixed solution. The mixed solution was transferred to a 50-mL polytetrafluoroethylene-lined reactor, and then heated at 120° C. for 36 hours to prepare a solution of C@Pd. The solution of C@Pd was separated by centrifuging to obtain solid matters. The solid matters were washed with deionized water and anhydrous ethanol twice, and then dried at 60° C. to obtain C@Pd nanospheres.

Preparation of precursor powders. 15.4753 g of lanthanum oxide ($La_2O_3$) and 0.8797 g of europium oxide ($Eu_2O_3$) were completely dissolved in nitric acid to prepare 250 mL of a solution of $La^{3+}$ and $Eu^{3+}$. 10 mL portions of the solution of $La^{3+}$ and $Eu^{3+}$ were added to a beaker by using a pipette, and then 0.0016 g of the C@Pd nanospheres was added to prepare a mixed solution. The pH value of the mixed solution was regulated to 2 by dripping nitric acid into the mixed solution. After that, a precipitant of oxalic acid was added to the mixed solution. The pH value of the mixed solution was then regulated to 9 by dripping ammonia water. The mixed solution was thoroughly stirred and reacted. A liquid suspension of products was obtained after conducting the reaction for 6 hours. The suspension was filtrated and washed with deionized water and anhydrous ethanol for twice. The solid matters were dried at 60° C. to obtain precursor powders.

Preparation of $La_{1.9}O_2S:Eu_{0.1}{}^{3+}@Pd_{0.00001}$. The precursor powders were mixed with 0.1282 g of sulfur powders and 0.0042 g of anhydrous sodium carbonate ($Na_2CO_3$) to obtain a mixture. The mixture was grinded and placed in a crucible of aluminium oxide, followed by being calcining at 1000° C. for 10 hours. The mixture was then cooled and grinded to obtain a luminescent material of $La_{1.9}O_2S:Eu_{0.1}{}^{3+}@Pd_{0.0001}$.

EXAMPLE 2

An oxysulfide luminescent material having a general chemical formula of $Gd_{1.8}O_2S:Eu_{0.2}{}^{3+}@Au_{0.01}$ was prepared. The notation of @ was coating the latter with the former.

Preparation of colloid containing Au nanoparticles. 20.6 mg of chloroauric acid ($AuCl_3HCl.4H_2O$) were dissolved in 16.8 mL of deionized water, followed by adding 14 mg of sodium citrate and 6 mg of cetyl trimethyl ammonium bromide while magnetically stirring to obtain a mixed solution. 1.9 mg of sodium borohydride/was dissolved in 10 mL of deionized water to obtain a solution of sodium borohydride having a concentration of $5\times10^{-3}$ mol/L. 17.6 mg of ascorbic acid were dissolved in 10 mL of deionized water to obtain a solution of ascorbic acid having a concentration of $1\times10^{-2}$ mol/L. While stirring, 0.08 mL of the solution of sodium borohydride was added to the mixed solution. After 5 minutes, 3.12 mL of the solution of ascorbic acid was added to the mixed solution. The reaction was conducted for 20 minutes to produce 20 mL of colloid containing Au nanoparticles having a concentration of $5\times10^{-3}$ mol/L.

Preparation of C@Au nanospheres. 0.0389 g of sucrose was dissolved in 24 mL of anhydrous ethanol to prepare an ethanol solution of sucrose. 16 mL of the colloid were added to the ethanol solution of sucrose to prepare a mixed solution. The mixed solution was transferred to a 50-mL polytetrafluoroethylene-lined reactor, and then heated at 160° C. for 20 hours to prepare a solution of C@Au. The solution of C@Au was separated by centrifuging to obtain solid matters. The solid matters were washed with deionized water and anhydrous ethanol for three times, and then dried at 80° C. to obtain C@Au nanospheres.

Preparation of precursor powders. 9 mL portions of a solution of gadolinium nitrate at 0.8 mol/L, and 2 mL portions of a solution of europium nitrate at 0.4 mol/L were added to a beaker by using a pipette, and then 0.96 g of the C@Au nanospheres was added to prepare a mixed solution. The pH value of the mixed solution was regulated to 3 by dripping nitric acid into the mixed solution. After that, a precipitant of oxalic acid was added to the mixed solution. The pH value of the mixed solution was then regulated to 8 by dripping ammonia water. The mixed solution was thoroughly stirred and reacted. A liquid suspension of products was obtained after conducting the reaction for 2 hours. The suspension was filtrated and washed with deionized water and anhydrous ethanol for twice. The solid matters were dried at 80° C. to obtain precursor powders.

Preparation of $Gd_{1.8}O_2S:EU_{0.2}{}^{3+}@Au_{0.01}$. The precursor powders were mixed with 0.1282 g of sulfur powders and 0.0084g of anhydrous sodium carbonate ($Na_2CO_3$) to obtain a mixture. The mixture was grinded and placed in a crucible of aluminium oxide, followed by being calcining at 1450° C. for 2 hours. The mixture was then cooled and grinded to obtain a luminescent material of $Gd_{1.8}O_2S:Eu_{0.2}{}^{3+}@Au_{0.01}$.

EXAMPLE 3

An oxysulfide luminescent material having a general chemical formula of $Gd_{1.999}O_2S:Eu_{0.001}{}^{3+}Pt_{0.005}$ was prepared. The notation of @ was coating the latter with the former.

Preparation of colloid containing Pt nanoparticles. 25.9 mg of chloroplatinic acid ($H_2PtCl_6.6H_2O$) were dissolved in 17 mL of deionized water, followed by adding 40.0 mg of sodium citrate and 60.0 mg of sodium dodecyl sulfonate while magnetically stirring to obtain a mixed solution. 1.9 mg of sodium borohydride was dissolved in 10 mL of deionized water to obtain a solution of sodium borohydride having a concentration of $5\times10^{-3}$ mol/L. 10 mL of a solution of hydrazine hydrate having a concentration of $5\times10^{-2}$ mol/L were prepared. While stirring, 0.4 mL of the solution of sodium borohydride was added to the mixed solution. After 5 minutes, 2.6 mL of the solution of hydrazine hydrate was added to the mixed solution. The reaction was conducted for 40 minutes to produce 20 mL of colloid containing Pt nanoparticles having a concentration of $2.5\times10^{-3}$ mol/L.

Preparation of C@Pt nanospheres. 0.0023 g of glucose was dissolved in 30 mL of anhydrous ethanol to prepare an ethanol solution of glucose. 10 mL of the colloid were added to the ethanol solution of glucose to prepare a mixed solution. The mixed solution was transferred to a 50-mL polytetrafluoroethylene-lined reactor, and then heated at 150° C. for 10 hours to prepare a solution of C@Pt. The solution of C@Pt was separated by centrifuging to obtain solid matters. The solid matters were washed with deionized water and anhydrous ethanol twice, and then dried at 70° C. to obtain C@Pt nanospheres.

Preparation of precursor powders. 19.99 mL portions of a solution of gadolinium nitrate ($Gd(NO_3)_3$) at 0.5 mol/L, and 0.5 mL portions of a solution of europium nitrate (Eu $(NO_3)_3$) at 0.01 mol/L were added to a beaker by using a pipette, and then 0.024 g of the C@Pt nanospheres was added to prepare a mixed solution. The pH value of the mixed solution was regulated to 2.5 by dripping nitric acid into the mixed solution. After that, a precipitant of oxalic acid was added to the mixed solution. The pH value of the mixed solution was then regulated to 8.5 by dripping ammonia water. The mixed solution was thoroughly stirred and reacted. A liquid suspension of products was obtained after conducting the reaction for 4 hours. The suspension was filtrated and washed with deionized water and anhydrous ethanol for twice. The solid matters were dried at 65° C. to obtain precursor powders.

Preparation of $Gd_{1.999}O_2S:Eu_{0.001}^{3+}@Pt_{0.005}$. The precursor powders were mixed with 0.1602 g of sulfur powders and 0.0530 g of anhydrous sodium carbonate ($Na_2CO_3$) to obtain a mixture. The mixture was grinded and placed in a crucible of aluminium oxide, followed by being calcining at 1250° C. for 6 hours. The mixture was then cooled and grinded to obtain a luminescent material of $Gd_{1.999}O_2S:Eu_{0.001}^{3+}@Pt_{0.005}$.

EXAMPLE 4

An oxysulfide luminescent material having a general chemical formula of $Y_{1.92}O_2S:Eu_{0.08}^{3+}@Ag_{0.00025}$ was prepared. The notation of @ was coating the latter with the former.

Preparation of colloid containing Ag nanoparticles. 3.4 mg of silver nitrate ($AgNO_3$) was dissolved in 18.4 mL of deionized water, followed by adding 42 mg of sodium citrate to obtain a mixed solution. 5.7 mg of sodium borohydride were dissolved in 10 mL of deionized water to obtain a solution of sodium borohydride having a concentration of $1.5 \times 10^{-2}$ mol/L. While stirring, 1.6 mL of the solution of sodium borohydride was rapidly added to the mixed solution. The reaction was conducted for 10 minutes to produce 20 mL of colloid containing Ag nanoparticles having a concentration of $1 \times 10^{-3}$ mol/L.

Preparation of C@Ag nanospheres. 5 g of glucose was dissolved in 35 mL of anhydrous ethanol to prepare an ethanol solution of glucose. 5 mL of the colloid were added to the ethanol solution of glucose to prepare a mixed solution. The mixed solution was transferred to a 50-mL polytetrafluoroethylene-lined reactor, and then heated at 180° C. for 24 hours to prepare a solution of C@Ag. The solution of C@Ag was separated by centrifuging to obtain solid matters. The solid matters were washed with deionized water and anhydrous ethanol for twice, and then dried at 60° C. to obtain C@Ag nanospheres.

Preparation of precursor powders. 19.99 mL portions of a solution of yttrium nitrate ($Y(NO_3)_3$) at 0.4 mol/L, and 3.2 mL portions of a solution of europium nitrate ($Eu(NO_3)_3$) at 0.1 mol/L were added to a beaker by using a pipette, and then 0.0016 g of the C@Ag nanospheres was added to prepare a mixed solution. The pH value of the mixed solution was regulated to 3 by dripping nitric acid into the mixed solution. After that, a precipitant of oxalic acid was added to the mixed solution. The pH value of the mixed solution was then regulated to 8 by dripping ammonia water. The mixed solution was thoroughly stirred and reacted. A liquid suspension of products was obtained after conducting the reaction for 4 hours. The suspension was filtrated and washed with deionized water and anhydrous ethanol for three times. The solid matters were dried at 60° C. to obtain precursor powders.

Preparation of $Y_{1.92}O_2S:Eu_{0.08}^{3+}@Ag_{0.00025}$. The precursor powders were mixed with 0.1282 g of sulfur powders and 0.0212 g of anhydrous sodium carbonate ($Na_2CO_3$) to obtain a mixture. The mixture was grinded and placed in a crucible of aluminium oxide, followed by being calcining at 1200° C. for 5 hours. The mixture was then cooled and grinded to obtain a luminescent material of $Y_{1.92}O_2S:Eu_{0.08}^{3+}@Ag_{0.00025}$.

Figure 2:
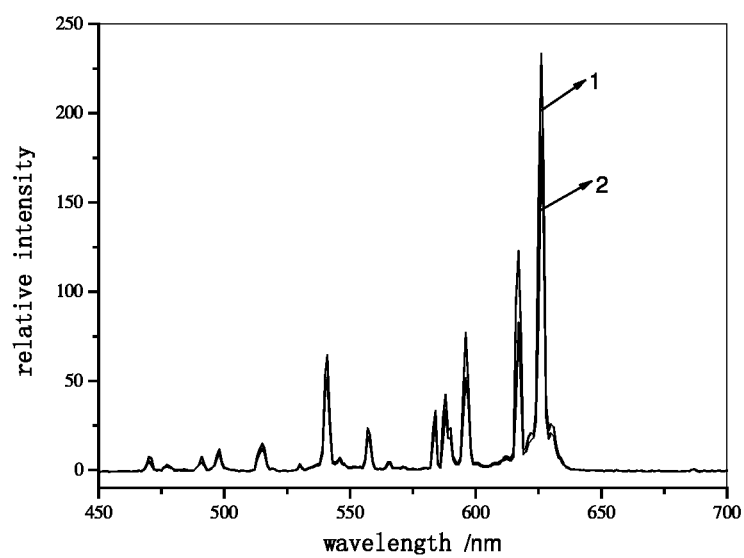
FIG. 2 is cathodoluminescence spectra of $Ln_{1.92}O_2S$:$Eu_{0.08}^{3+}$@$Ag_{0.00025}$ luminescent material coating metal nanoparticles Ag (curve 1), compared with $Ln_{1.92}O_2S$:$Eu_{0.08}^{3+}$ luminescent material without coating metal nanoparticles (curve 2), under 1.5 kv voltage, according to Example 4.

FIG. 2 is cathodoluminescence spectra of $Y_{1.92}O_2S:Eu_{0.08}^{3+}@Ag_{0.00025}$ luminescent material coating metal nanoparticles Ag (curve 1), compared with $Y_{1.92}O_2S:Eu_{0.08}^{3+}$ luminescent material without coating metal nanoparticles (curve 2), under 1.5 kv voltage, according to this embodiment. It can be seen from FIG. 2 that the emission peak shown at about 626nm, luminescent intensity of the luminescent material coating metal nanoparticles is increased by 25%.

EXAMPLE 5

An oxysulfide luminescent material having a general chemical formula of $La_{1.85}O_2S:Eu_{0.15}^{3+}@Cu_{0.0001}$ was prepared. The notation of @ was coating the latter with the former.

Preparation of colloid containing Cu nanoparticles. 1.6 mg of copper nitrate ($Cu(NO_3)_2$) was dissolved in 16 mL of deionized water, followed by adding 12 mg of polyvinylpyrrolidone (PVP) while magnetically stirring to obtain a mixed solution. 0.4 mg of sodium borohydride was dissolved in 10 mL of ethanol to obtain a solution of sodium borohydride having a concentration of $1 \times 10^{-3}$ mol/L. While stirring, 4 mL of the solution of sodium borohydride was rapidly added to the mixed solution. The reaction was conducted for 10 minutes to produce 20 mL of colloid containing Cu nanoparticles having a concentration of $4 \times 10^{-4}$ mol/L.

Preparation of C@Cu nanospheres. 6 g of sucrose was dissolved in 39.5 mL of anhydrous ethanol to prepare an ethanol solution of sucrose. 0.5 mL of the colloid was added to the ethanol solution of sucrose to prepare a mixed solution. The mixed solution was transferred to a 50-mL polytetrafluoroethylene-lined reactor, and then heated at 200° C. for 5 hours to prepare a solution of C@Cu. The solution of C@Cu was separated by centrifuging to obtain solid matters. The solid matters were washed with deionized water and anhydrous ethanol for twice, and then dried at 75° C. to obtain C@Cu nanospheres.

Preparation of precursor powders. 18.5 mL portions of a solution of lanthanum nitrate ($La(NO_3)_3$) at 0.4 mol/L, and 5 mL portions of a solution of europium nitrate ($Eu(NO_3)_3$) at 0.3 mol/L were added to a beaker by using a pipette, and then 0.0048 g of the C@Cu nanospheres was added to prepare a mixed solution. The pH value of the mixed solution was regulated to 3 by dripping nitric acid into the mixed solution. After that, a precipitant of oxalic acid was added to the mixed solution. The pH value of the mixed solution was then regulated to 9 by dripping ammonia water. The mixed solution was thoroughly stirred and reacted. A liquid suspension of products was obtained after conducting the reaction for 6 hours. The suspension was filtrated and washed with deionized water and anhydrous ethanol for twice. The solid matters were dried at 70° C. to obtain precursor powders.

Preparation of $La_{1.85}O_2S:Eu_{0.15}^{3+}@Cu_{0.0001}$. The precursor powders were mixed with 0.1282 g of sulfur powders and 0.0106 g of anhydrous sodium carbonate ($Na_2CO_3$) to obtain a mixture. The mixture was grinded and placed in a crucible of aluminium oxide, followed by being calcining at 1350° C. for 4 hours. The mixture was then cooled and grinded to obtain a luminescent material of $La_{1.85}O_2S:Eu_{0.15}^{3+}@CU_{0.0001}$.

EXAMPLE 6

An oxysulfide luminescent material having a general chemical formula of $Y_{1.95}O_2S:Eu_{0.05}^{3+}@(Ag_{0.5}/Au_{0.5})_{0.00125}$ was prepared. The notation of @ was coating the latter with the former. "/" means the coexistence of the two matters.

Preparation of colloid containing Ag and Au nanoparticles. 6.2 mg of chloroauric acid ($AuCl_3HCl.4H_2O$) and 2.5 mg of silver nitrate were dissolved in 28 mL of deionized water, followed by adding 22 mg of sodium citrate and 20 mg of polyvinylpyrrolidone (PVP) while magnetically stirring to obtain a mixed solution. 5.7 mg of sodium borohydride were dissolved in 10 mL of deionized water to obtain a solution of sodium borohydride having a concentration of $1.5 \times 10^{-2}$ mol/L. While stirring, 2 mL of the solution of sodium borohydride was rapidly added to the mixed solution. The reaction was conducted for 20 minutes to produce 30 mL of colloid containing Ag and Au nanoparticles having a concentration of $1 \times 10^{-3}$ mol/L.

Preparation of C@(Ag/Au) nanospheres. 5.705 g of sucrose was dissolved in 30 mL of anhydrous ethanol to prepare an ethanol solution of sucrose. 10 mL of the colloid were added to the ethanol solution of sucrose to prepare a mixed solution. The mixed solution was transferred to a 50-mL polytetrafluoroethylene-lined reactor, and then heated at 140° C. for 15 hours to prepare a solution of C@(Ag/Au). The solution of C@(Ag/Au) was separated by centrifuging to obtain solid matters. The solid matters were washed with deionized water and anhydrous ethanol for twice, and then dried at 80° C. to obtain C@(Ag/Au) nanospheres.

Preparation of precursor powders. 19.5 mL portions of a solution of yttrium nitrate ($Y(NO_3)_3$) at 0.4 mol/L, and 3.2 mL portions of a solution of europium nitrate ($Eu(NO_3)_3$) at 0.1 mol/L were added to a beaker by using a pipette, and then 0.0012 g of the C@(Ag/Au) nanospheres was added to prepare a mixed solution. The pH value of the mixed solution was regulated to 3 by dripping nitric acid into the mixed solution. After that, a precipitant of oxalic acid was added to the mixed solution. The pH value of the mixed solution was then regulated to 8 by dripping ammonia water. The mixed solution was thoroughly stirred and reacted. A liquid suspension of products was obtained after conducting the reaction for 4 hours. The suspension was filtrated and washed with deionized water and anhydrous ethanol for twice. The solid matters were dried at 60° C. to obtain precursor powders.

Preparation of $Y_{1.95}O_2S:Eu_{0.05}^{3+}@(Ag_{0.5}/Au_{0.5})_{0.00125}$. The precursor powders were mixed with 0.1282 g of sulfur powders and 0.0127 g of anhydrous sodium carbonate ($Na_2CO_3$) to obtain a mixture. The mixture was grinded and placed in a crucible of aluminium oxide, followed by being calcining at 1100° C. for 8 hours. The mixture was then cooled and grinded to obtain a luminescent material of $Y_{1.95}O_2S:Eu_{0.05}^{3+}@(Ag_{0.5}/Au_{0.5})_{0.00125}$.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention.

What is claimed is:

1. An oxysulfide luminescent material having a general chemical formula of $Ln_{2-x}O_2S:Eu_x^{3+}@M_y$, wherein $Eu^{3+}$ is doped in $Ln_{2-x}O_2S$; $Ln_{2-x}O_2S:Eu_x^{3+}$ has a porous structure, and @ is coating; Ln is selected from Y, Gd and La; M is at least one of Ag, Au, Pt, Pd and Cu nanoparticles; x is in a range of $0<x\leq0.2$; y is a molar ratio of M to $Ln_{2-x}O_2S:Eu_x^{3+}$ and y is in a range of $0<y\leq1\times10^{-2}$.

2. The oxysulfide luminescent material according to claim 1, wherein x is in a range of $0.001 \leq x 0.1$.

3. The oxysulfide luminescent material according to claim 1, wherein y is in a range of $1\times10^{-5} \leq y \leq 1\times10^{-3}$.

4. A method for preparing an oxysulfide luminescent material, comprising:
   mixing and reacting a solution of salt containing metal M with an additive and a reducing agent to prepare a colloid containing M, wherein the metal M is at least one of Ag, Au, Pt, Pd and Cu nanoparticles; the additive is at least one of polyvinylpyrrolidone, sodium citrate, cetyl trimethyl ammonium bromide, sodium dodecyl sulfate and sodium dodecyl sulfonate;
   adding the colloid containing M to an ethanol solution of sucrose or glucose to obtain a mixed solution, then heating the mixed solution at 120° C.-200° C. to form a solution of C@M, and centrifuging the solution of C@M, washing and drying to obtain C@M nanospheres; @ is coating M with C, and a molar ratio of M to C from sucrose or glucose is in a range of $5\times10^{-4} - 5\times10^{-2}$;
   adding the C@M nanospheres to a solution of $Ln^{3+}$ and $Eu^{3+}$ according to a molar ratio of $Ln^{3+}$ to $Eu^{3+}$ to M which is (2-x):x:y; regulating the pH value of the solution to 2-3, followed by adding oxalic acid and regulating the pH value to 8-9 to obtain a liquid suspension of $Ln_2(C_2O_4)_3:Eu^{3+}@C@M$; separating the liquid suspension to obtain $Ln_2(C_2O_4)_3:Eu^{3+}@C@M$ solid; $Ln^{3+}$ is $Y^{3+}$, $Gd^{3+}$ or $La^{3+}$, and x is in a range of $0<x\leq0.2$, y is in a range of $0<y\leq1\times10^{-2}$; and,
   mixing sulfur powders with the $Ln_2(C_2O_4)_3:Eu^{3+}@C@M$ solid according to a molar ratio of S to $Ln^{3+}$ which is 1:(2-x), followed by adding a fluxing agent and calcining at 1000° C.-1450° C. to obtain an oxysulfide luminescent material having a general chemical formula of $Ln_{2-x}O_2S:Eu_x^{3+}@M_y$; $Eu^{3+}$ is doped in $Ln_{2-x}O_2S$ to form $Ln_{2-x}O_2S:Eu_x^{3+}$ having a porous structure, and @ is coating.

5. The method for preparing an oxysulfide luminescent material according to claim 4, wherein solute of the solution of salt containing metal M is at least one of $PdCl_2.2H_2O$, $AuCl_3.HCl.4H_2O$, $H_2PtCl_6.6H_2O$, $AgNO_3$ and $Cu(NO_3)_2$; solvent of the solution is deionized water or ethanol; a concentration of the solution is in a range of $1\times10^{31\ 3}-5\times10^{-2}$ mol/L.

6. The method for preparing an oxysulfide luminescent material according to claim 4, wherein a concentration of the additive is in a range of $1\times10^{-4}$ g/mL$-5\times10^{-2}$ g/mL to the colloid containing M.

7. The method for preparing an oxysulfide luminescent material according to claim 4, wherein the reducing agent is at least one of hydrazine hydrate, ascorbic acid, sodium citrate and sodium borohydride; a molar ratio of the reducing agent to M is in a range of 3.6:1-18:1.

8. The method for preparing a an oxysulfide luminescent material according to claim 4, wherein the solution of $Ln^{3+}$ and $Eu^{3+}$ is a mixed solution of $Ln(NO_3)_3$ and $Eu(NO_3)_3$.

9. The method for preparing a an oxysulfide luminescent material according to claim 4, wherein the fluxing agent is anhydrous sodium carbonate; a molar ratio of the fluxing agent to the sulfur powder is in a range of 1:100-1:10.

* * * * *

UNITED STATES PATENT AND TRADEMARK OFFICE
CERTIFICATE OF CORRECTION

PATENT NO. : 9,650,562 B2
APPLICATION NO. : 14/439010
DATED : May 16, 2017
INVENTOR(S) : Mingjie Zhou and Rong Wang Page 1 of 1

It is certified that error appears in the above-identified patent and that said Letters Patent is hereby corrected as shown below:

On the Title Page

Item (73) Assignee's Information should read:
OCEAN'S KING LIGHTING SCIENCE & TECHNOLOGY CO., LTD. Shenzhen (CN)
SHENZHEN OCEAN'S KING LIGHTING ENGINEERING CO., LTD. Shenzhen (CN)

Signed and Sealed this
Tenth Day of October, 2017

Joseph Matal
*Performing the Functions and Duties of the*
*Under Secretary of Commerce for Intellectual Property and*
*Director of the United States Patent and Trademark Office*